(12) United States Patent
Matsushita (10) Patent No.: US 12,179,515 B2
(45) Date of Patent: Dec. 31, 2024

(54) PNEUMATIC TIRE

(71) Applicant: The Yokohama Rubber Co., LTD., Tokyo (JP)

(72) Inventor: Kotaro Matsushita, Kanagawa (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 667 days.

(21) Appl. No.: 17/310,136

(22) PCT Filed: Dec. 5, 2019

(86) PCT No.: PCT/JP2019/047591
§ 371 (c)(1),
(2) Date: Jul. 20, 2021

(87) PCT Pub. No.: WO2020/153011
PCT Pub. Date: Jul. 30, 2020

(65) Prior Publication Data
US 2022/0048331 A1    Feb. 17, 2022

(30) Foreign Application Priority Data
Jan. 23, 2019    (JP) .................. 2019-009656

(51) Int. Cl.
*B60C 11/03*    (2006.01)
*B60C 11/12*    (2006.01)
(52) U.S. Cl.
CPC ...... *B60C 11/0304* (2013.01); *B60C 11/0302* (2013.01); *B60C 11/0306* (2013.01); *B60C 11/1236* (2013.01); *B60C 2011/0372* (2013.01)

(58) Field of Classification Search
CPC ............. B60C 11/0304; B60C 11/0348; B60C 11/0306; B60C 11/1236
See application file for complete search history.

(56) References Cited

U.S. PATENT DOCUMENTS

2014/0290815 A1\* 10/2014 Tomida ............... B60C 11/1236
152/209.18
2017/0368888 A1  12/2017 Wakasugi et al.
(Continued)

FOREIGN PATENT DOCUMENTS

CN    107539033 A    1/2018
JP    01095908 A * 4/1989 ............. B60C 11/00
(Continued)

*Primary Examiner* — Justin R Fischer
*Assistant Examiner* — Philip N Schwartz
(74) *Attorney, Agent, or Firm* — Thorpe North & Western (57) ABSTRACT

A pneumatic tire tread pattern includes, on a first side in a width direction relative to a tire centerline, first lug grooves in a shoulder land portion extending from an outer side in the width direction toward and connecting with a shoulder side main groove; and second lug grooves in a middle land portion between the shoulder side main groove and a center side main groove, the second lug grooves extending from a portion of the shoulder side main groove between connection positions of circumferentially adjacent first lug grooves with the shoulder side main groove, toward the center side main groove, and being closed within the middle land portion. The first lug grooves are inclined, at the connection position, to one side in the circumferential direction relative to the width direction. The second lug grooves are inclined to be parallel with an inclination direction of the first lug groove.

19 Claims, 3 Drawing Sheets

(56) References Cited

U.S. PATENT DOCUMENTS

2018/0194173 A1* 7/2018 Shibai .................... B60C 11/12
2018/0264891 A1* 9/2018 Uno .................... B60C 11/1263

FOREIGN PATENT DOCUMENTS

| | | | | |
|---|---|---|---|---|
| JP | 2014-181021 A | 9/2014 | | |
| JP | 5765492 B1 | 8/2015 | | |
| JP | 2015-171841 A | 10/2015 | | |
| JP | 2017-30557 A | 2/2017 | | |
| JP | 2017-65678 A | 4/2017 | | |
| JP | 2017-88114 A | 5/2017 | | |
| JP | 2017128194 A | * 7/2017 | ............ | B60C 11/13 |
| JP | 2018-154148 A | 10/2018 | | |
| WO | WO-2017022309 A1 | * 2/2017 | ............ | B60C 11/03 |
| WO | 2017/126625 A1 | 7/2017 | | |

\* cited by examiner

PNEUMATIC TIRE

TECHNICAL FIELD

The present technology relates to a pneumatic tire including lug grooves in regions of land portions.

BACKGROUND ART

All-season tires are required to deliver high performance in a case where traveling on dry road surfaces as well as in a case where traveling on snow-covered road surfaces. In the related art, tires are known that are intended to provide both on-snow performance and steering stability on dry road surfaces in a compatible manner (see Japan Patent No. 5765492).

In the tire of Japan Patent No. 5765492, five land portions extending in the tire circumferential direction are formed in the tread surface of a tread portion by four circumferential main grooves extending in the tire circumferential direction, and the land portions include a center land portion, middle land portions, and shoulder land portions. The tire of Japan Patent No. 5765492 includes lug grooves and sipes formed in each of the land portions and intersecting with the tire circumferential direction, and thus has good drainage properties and snow discharge properties and can thus provide on-snow performance. Furthermore, the tire of Japan Patent No. 5765492 independently includes, in each of the middle land portions, first sub grooves including lug grooves each at one end opening in a circumferential main groove and at the other end terminating within the middle land portion; and second sub grooves including lug grooves each at one end opening in a circumferential main groove and the other end terminating within the middle land portion and sipes each at one end opening at the terminating end of the lug groove and the other end terminating within the middle land portion. Thus, the middle land portion is formed as a rib extending continuously in the tire circumferential direction and has increased rigidity, providing steering stability performance on dry road surfaces. As a result, both on-snow performance and steering stability performance on dry road surfaces can be provided in a compatible manner.

In the tire including the lug grooves in the regions of the land portions, snow column shear force is obtained in a case where the snow-covered road surface is kicked off, improving on-snow performance. On the other hand, formation of the lug grooves locally reduces the rigidity of tread rubber located in the regions of the land portions, leading to a distribution of rigidity in the tire circumferential direction. Thus, uneven wear may be more likely to occur.

SUMMARY

The present technology provides a pneumatic tire including lug grooves in the regions of land portions, the pneumatic tire providing both on-snow performance and uneven wear resistance performance in a highly compatible manner.

An aspect of the present technology is a pneumatic tire, including a tread pattern in a tread portion,
the tread pattern including:
a shoulder side main groove and a center side main groove disposed at an interval on a first side in a tire width direction with respect to a tire centerline and extending in a tire circumferential direction;
a plurality of first lug grooves in a region of a shoulder land portion located on an outer side of the shoulder side main groove in the tire width direction, the first lug groove extending from an outer side in the tire width direction toward the shoulder side main groove and connecting with the shoulder side main groove, the first lug grooves being disposed at intervals in the tire circumferential direction; and
a plurality of second lug grooves in a region of a middle land portion interposed between the shoulder side main groove and the center side main groove, the second lug groove extending from a portion of the shoulder side main groove between connection positions of the first lug grooves adjacent in the tire circumferential direction with the shoulder side main groove, toward the center side main groove, the second lug grooves being closed within the region of the middle land portion, the second lug grooves being disposed at intervals in the tire circumferential direction,
the first lug groove being inclined, at the connection position, to one side in the tire circumferential direction with respect to the tire width direction, and
the second lug groove being inclined with respect to the tire width direction to be parallel with an inclination direction of the first lug groove.

The shoulder side main groove is located further on the outer side in the tire width direction than the center side main groove.

Preferably, assuming that P1 is the interval in the tire circumferential direction between the first lug grooves adjacent in the tire circumferential direction, the second lug groove located between two lines obtained by extending the first lug grooves along the inclination direction of the first lug grooves and across the shoulder side main groove is located a length of from 40 to 60% of the interval P1 away in the tire circumferential direction from one of the lines that is closest to the second lug groove.

Preferably, an outer end of the first lug groove in the tire width direction is closed within the region of the shoulder land portion, and
the tread pattern further includes a first sipe in the region of the shoulder land portion, the first sipe extending, from a closed end of the first lug groove, further to the outer side in the tire width direction than a ground contact edge in the tire width direction, the ground contact edge located in the shoulder land portion.

Preferably, the tread pattern further includes, in the region of the middle land portion, a second sipe extending from a closed end of the second lug groove to an inner side in the tire width direction.

Preferably, in a case where the shoulder side main groove and the center side main groove are designated as a first shoulder side main groove and a first center side main groove and where the shoulder land portion and the middle land portion are designated as a first shoulder land portion and a first middle land portion,
the tread pattern further includes:
a second shoulder side main groove and a second center side main groove disposed at an interval on a second side in the tire width direction with respect to the tire centerline, the second side differing from the first side, the second shoulder side main groove and the second center side main groove extending in the tire circumferential direction;
a plurality of third lug grooves in a region of a second shoulder land portion located on an outer side of the second shoulder side main groove in the tire width direction, the third lug groove including a closed end and extending from the closed end toward the second shoulder side main groove and connecting with the second shoulder side main groove, the third lug grooves being disposed at intervals in the tire circumferential direction;

a plurality of fourth lug grooves in a region of a second middle land portion interposed between the second shoulder side main groove and the second center side main groove, the fourth lug grooves extending from the second shoulder side main groove toward the second center side main groove along extension lines obtained by extending the third lug grooves in both an extension direction of the third lug grooves and a direction opposite to the extension direction, the fourth lug grooves each being closed within the second middle land portion and being disposed at intervals in the tire circumferential direction;

a plurality of fifth lug grooves in the region of the second middle land portion, the fifth lug groove extending between the extension lines adjacent in the tire circumferential direction, from the second shoulder side main groove toward the second center side main groove and connecting with the second center side main groove, the fifth lug grooves being disposed at intervals in the tire circumferential direction; and a plurality of sixth lug grooves in the region of the second shoulder land portion, the sixth lug groove extending between the extension lines adjacent in the tire circumferential direction, from a position spaced apart from the second shoulder side main groove toward an outer side in the tire width direction, the sixth lug grooves being disposed at intervals in the tire circumferential direction, the fifth lug groove extending, at a connection position with the second shoulder side main groove, in a direction parallel with portions of the extension lines extending in the extension direction, and the sixth lug groove extending in a direction parallel with portions of the extension lines extending in the direction opposite to the extension direction.

The second shoulder side main groove is located further on the outer side in the tire width direction than the second center side main groove.

Preferably, the sixth lug groove is located a length of from 40 to 60% of an interval P3 in the tire circumferential direction between the third lug grooves adjacent in the tire circumferential direction, away from the third lug groove disposed closest to the sixth lug groove among the third lug grooves adjacent across the sixth lug groove in the tire circumferential direction.

Preferably, the fifth lug groove is located a length of from 40 to 60% of an interval P4 in the tire circumferential direction between the fourth lug grooves adjacent in the tire circumferential direction, away from the fourth lug groove disposed closest to the fifth lug groove among the fourth lug grooves adjacent across the fifth lug groove in the tire circumferential direction.

Preferably, the tread pattern further includes a third sipe in the region of the second shoulder land portion, the third sipe extending and connecting, with a closed end of the sixth lug groove, a connection position of the fifth lug groove with the second shoulder side main groove.

Preferably, the tread pattern further includes a fourth sipe in the region of the second middle land portion, the fourth sipe extending from a closed end of the fourth lug groove in a direction parallel with the extension direction of the fifth lug groove and connecting with the second center side main groove.

The tread pattern is suitable in a case where a vehicle mounting orientation is designated such that the first side faces a vehicle inner side.

A ratio of a total of opening areas of the main grooves and the lug grooves in a ground contact surface of the tread portion to an area of the ground contact surface of the tread portion ranges from 25 to 36%, a ratio of a total of opening areas of the main grooves in the ground contact surface of the tread portion to the area of the ground contact surface of the tread pattern ranges from 15 to 22%, and a snow traction index expressed by Formula (1) below ranges from 115 to 150:

$$STI = -6.8 + 2202 * \rho_g + 672 * \rho_s + 7.6 * D_g \qquad (1)$$

(in Formula (1), $\rho_g$ is a value obtained by dividing a total length (mm) of lengths of all the lug grooves provided in the region of the land portion, the lengths being projected in the tire width direction, by (ground contact width×circumferential length of the region of the land portion) (mm²), $\rho_s$ is a value obtained by dividing a total length (mm) of lengths of all the sipes provided in the region of the land portion, the lengths being projected in the tire width direction, by (ground contact width×circumferential length of the region of the land portion) (mm²), and $D_g$ is an average depth (mm) of the lug grooves provided in the region of the land portion.)

According to an embodiment of the present technology, in a pneumatic tire including lug grooves in the region of the land portion, both on-snow performance and uneven wear resistance performance can be provided in a highly compatible manner.

DETAILED DESCRIPTION

Overall Description of Tire

Figure 1:
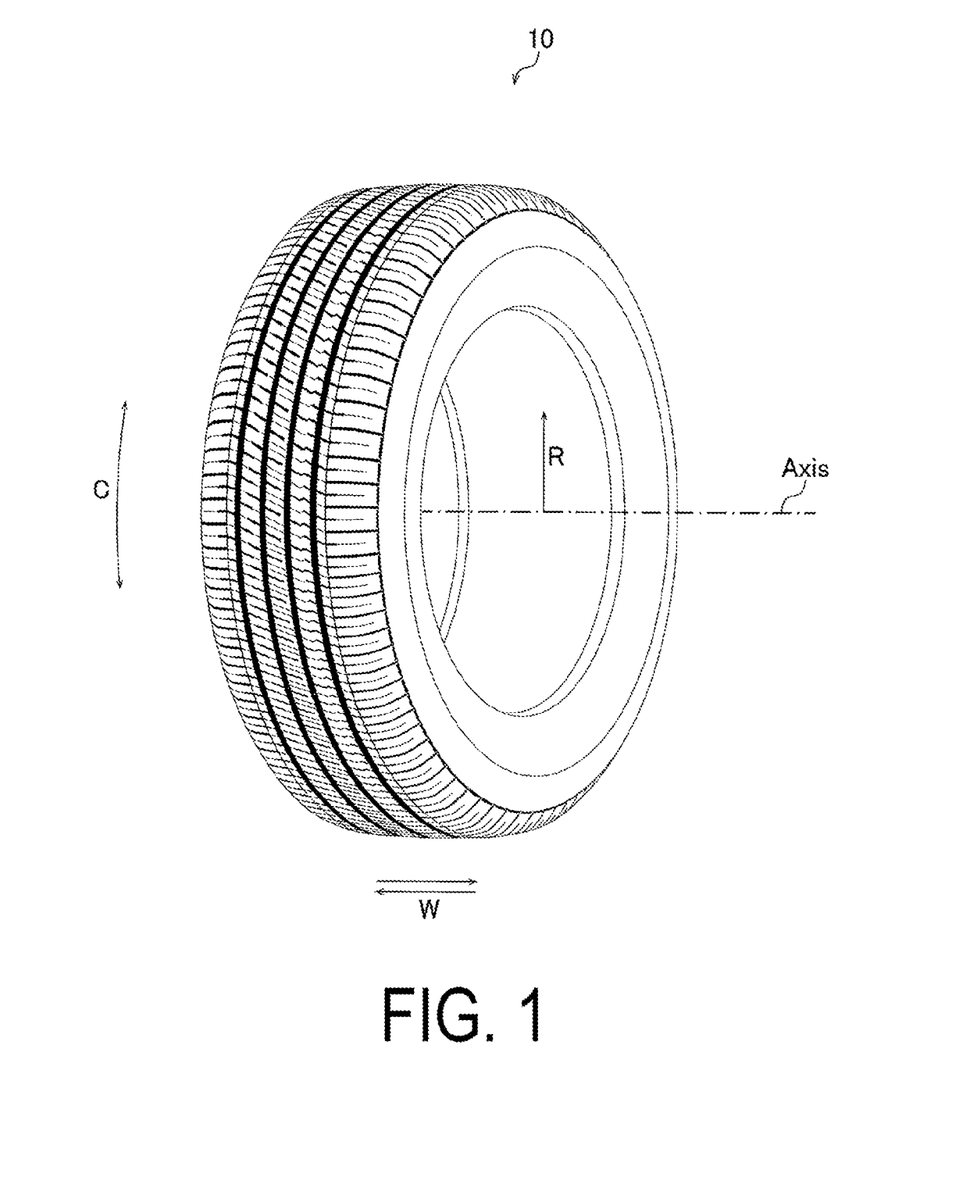
FIG. 1 is a perspective view illustrating an example of a pneumatic tire of the present embodiment.
Figure 2:
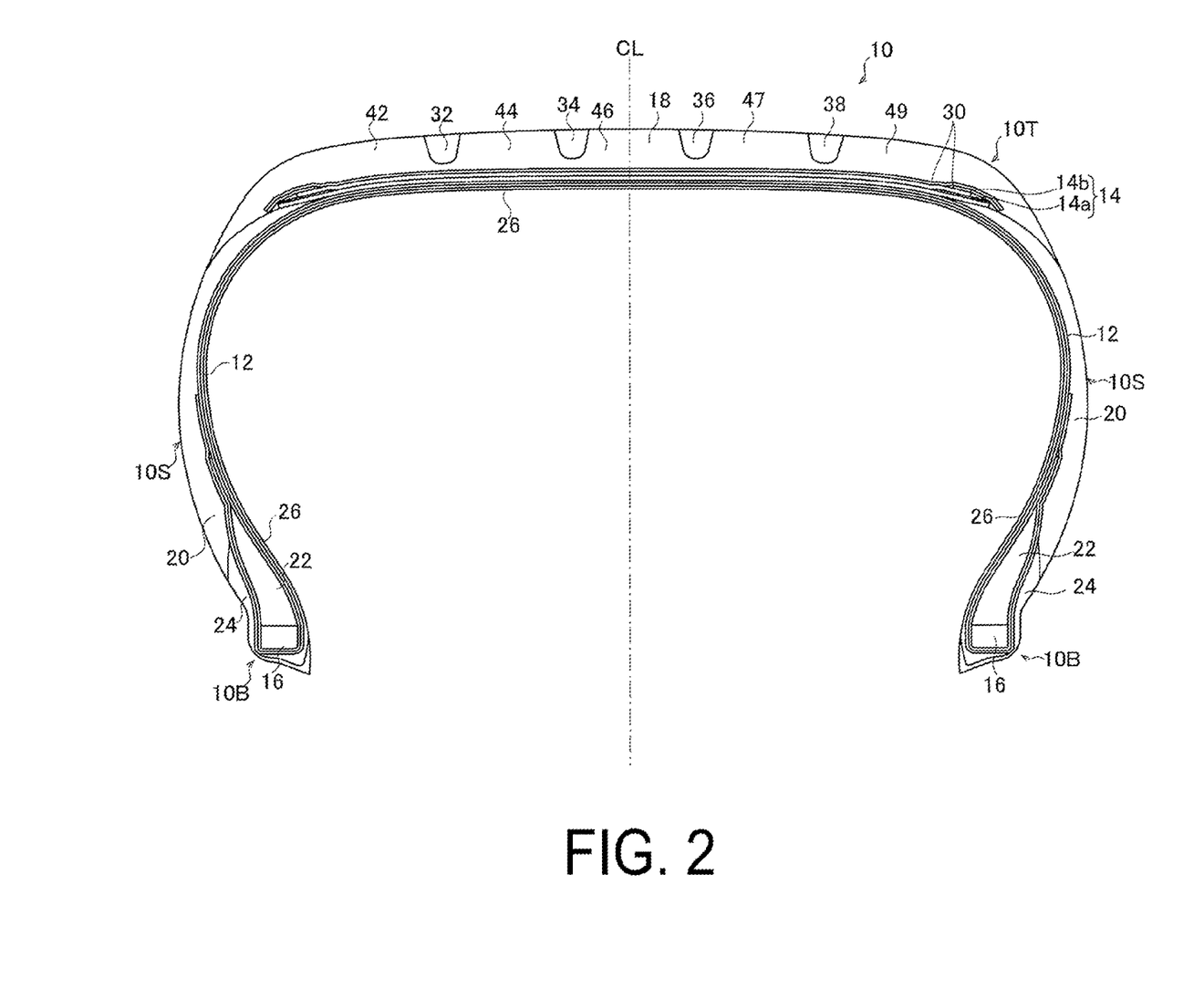
FIG. 2 is a diagram illustrating an example of a profile cross-section of the pneumatic tire according to the present embodiment.

A pneumatic tire according to an embodiment of the present technology will be described hereinafter. FIG. 1 is a perspective view illustrating a pneumatic tire (hereinafter referred to as "tire") 10 of the present embodiment. The present embodiment includes various embodiments described below. FIG. 2 is a tire cross-sectional view illustrating a cross section of the tire 10.

The tire 10 is, for example, a tire for a passenger vehicle. A tire for a passenger vehicle refers to a tire specified in Chapter A of the JATMA YEAR BOOK 2012 (standards of The Japan Automobile Tyre Manufacturers Association, Inc.). The tire 10 can also be applied to a tire for a light truck specified in Chapter B and a tire for a truck and a bus specified in Chapter C.

A tire width direction W is a direction parallel to a rotation axis Axis of the tire. An outer side in the tire width direction is a side away from a tire centerline CL representing a tire equatorial plane in the tire width direction W. Additionally, an inner side in the tire width direction is a side closer to the tire centerline CL in the tire width direction W. A tire circumferential direction C is the direction of rotation about the rotation axis Axis of the tire. A tire radial direction R is a direction orthogonal to the rotation axis Axis of the pneumatic tire. An outer side in the tire radial direction refers to a side away from the rotation axis Axis. Additionally, an inner side in the tire radial direction refers to a side closer to the rotation axis Axis.

Tire Structure

FIG. 2 is a profile cross-sectional view of an example of the tire 10 of the present embodiment. The tire 10 includes a tread portion 10T including a tread pattern, a pair of bead portions 10B, and a pair of side portions 10S provided in both sides of the tread portion 10T and connecting the pair of bead portions 10B with the tread portion 10T.

The tire 10 includes a carcass ply 12, a belt 14, and a bead core 16 as framework members and mainly includes a tread rubber member 18, side rubber members 20, bead filler rubber members 22, rim cushion rubber members 24, and an innerliner rubber member 26 around the framework members.

The carcass ply 12 is formed of a carcass ply member that is made of organic fibers covered with rubber and wound between a pair of the annular bead cores 16 into a toroidal shape. The carcass ply 12 is wound around the bead cores 16 and extends to an outer side in the tire radial direction. The belt 14 is provided in an outer side of the carcass ply 12 in the tire radial direction and includes two belt members 14a and 14b. The belt 14 includes a member made of a steel cord covered with rubber and arranged at a predetermined inclination angle, for example, at from 20 to 30 degrees with respect to the tire circumferential direction. The belt member 14a that is a lower layer has a greater width in the tire width direction than the width of the belt member 14b that is an upper layer. The steel cords of the two belt members 14a and 14b are inclined in opposite directions. As such, the belt members 14a and 14b are crossing layers serving to suppress expansion of the carcass ply 12 due to the pressure of the air in the tire.

The tread rubber member 18 is provided in an outer side of the belt 14 in the tire radial direction. The side rubber members 20 are connected to both end portions of the tread rubber member 18 and form the side portions 10S. The rim cushion rubber members 24 are respectively provided at ends on inner sides of the side rubber members 20 in the tire radial direction and come into contact with a rim on which the tire 10 is mountable. Each of the bead filler rubber members 22 is provided in an outer side of each of the bead cores 16 in the tire radial direction and is interposed between a portion of the carcass ply 12 prior to being wound around the bead core 16 and a portion of the carcass ply 12 wound around the bead core 16. The innerliner rubber member 26 is provided on the inner surface of the tire 10 facing a tire cavity region that is filled with air and is surrounded by the tire 10 and the rim.

In addition, two belt covers 30 made of organic fiber covered with rubber are provided between the belt member 14b and the tread rubber member 18, and the two belt covers 30 cover the belt 14 from the outer side of the belt 14 in the tire radial direction.

Tread Pattern

Figure 3:
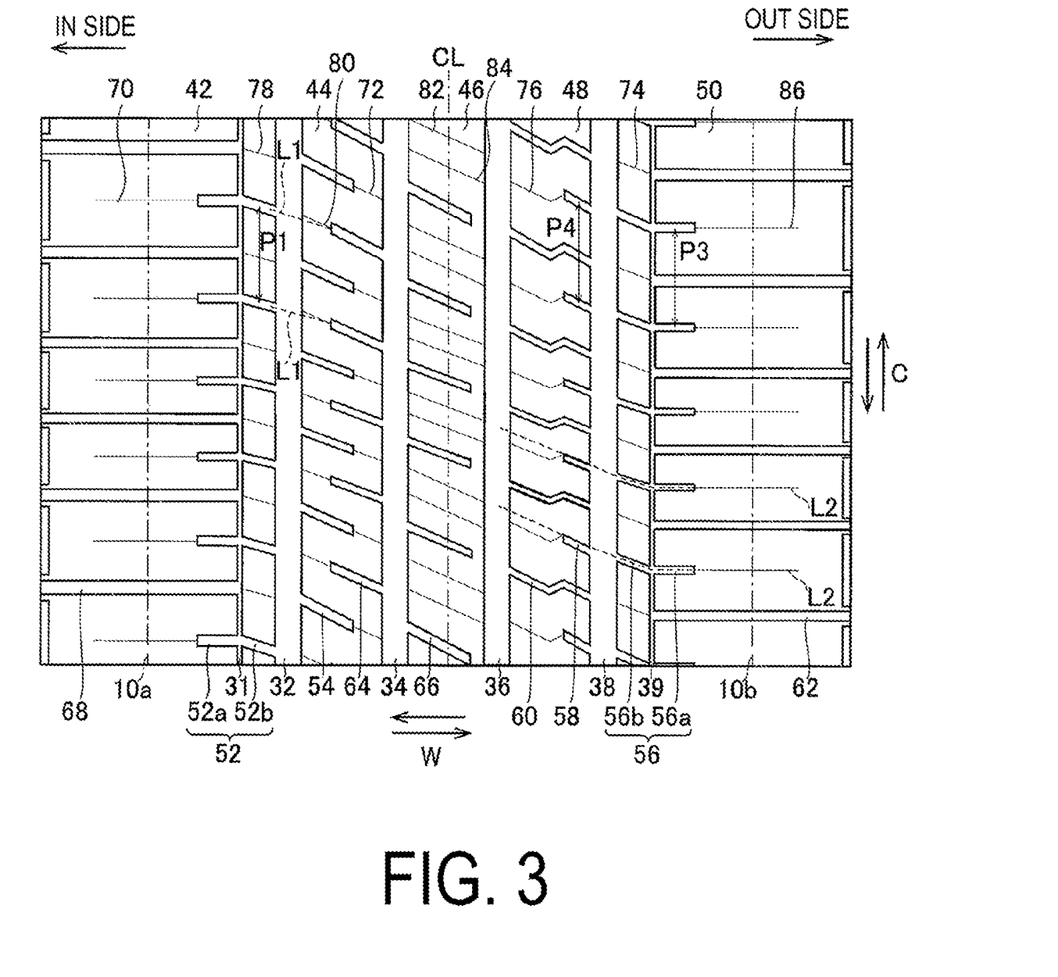
FIG. 3 is a diagram illustrating an example of a tread pattern of the tire of FIG. 1.

FIG. 3 is a diagram illustrating an example of a tread pattern of the tire 10 of FIG. 1. Note that the tire 10 including the tread pattern illustrated in FIG. 3 is mounted such that one side (first side) in the tire width direction with respect to the tire centerline CL faces a vehicle inner side (IN side), whereas the other side (second side) faces a vehicle outer side (OUT side) but that the tire 10 may be mounted such that the one side faces the vehicle outer side (OUT side), whereas the other side faces the vehicle inner side (IN side).

The tread pattern illustrated in FIG. 3 includes a first shoulder side main groove 32, a first center side main groove 34, a second center side main groove 36, and a second shoulder side main groove 38.

The main grooves 32, 34, 36, 38 are grooves extending in the tire circumferential direction. The first shoulder side main groove 32 and the first center side main groove 34 are disposed at an interval from each other on one side (first side) in the tire width direction with respect to the tire centerline CL. The second shoulder side main groove 38 and the second center side main groove 36 are disposed at an interval from each other on the second side (second side) in the tire width direction with respect to the tire centerline CL.

In the tread pattern illustrated in FIG. 3, a first shoulder land portion region 42 is located on the outer side of the first shoulder side main groove 32 in the tire width direction.

A first middle land portion region 44 is located between the first shoulder side main groove 32 and the first center side main groove 34.

A center land portion region 46 is located between the first center side main groove 34 and the second center side main groove 36.

A second middle land portion region 48 is disposed between the second center side main groove 36 and the second shoulder side main groove 38.

A second shoulder land portion region 50 is disposed on the outer side in the tire width direction of the second shoulder side main groove 38.

The tread pattern illustrated in FIG. 3 further includes a first narrow groove 31 and a second narrow groove 39. The narrow grooves 31, 39 are grooves that extend in the tire circumferential direction, and have a smaller groove width than the main grooves 32, 34, 36, 38. Additionally, the narrow grooves 31, 39 have a smaller groove depth than the main grooves 32, 34, 36, 38.

The tread pattern illustrated in FIG. 3 further includes a plurality of first lug grooves 52, a plurality of second lug grooves 54, a plurality of third lug grooves 56, a plurality of fourth lug grooves 58, a plurality of fifth lug grooves 60, a plurality of sixth lug grooves 62, a plurality of seventh lug grooves 64, a plurality of eighth lug grooves 66, and a plurality of ninth lug grooves 68. The lug grooves 52, 54, 56, 58, 60, 62, 64, 66, 68 are grooves that extend in the tire width direction within the land portion regions.

The tread pattern illustrated in FIG. 3 further includes a plurality of first sipes 70, a plurality of second sipes 72, a plurality of third sipes 74, a plurality of fourth sipes 76, a plurality of fifth sipes 78, a plurality of sixth sipes 80, a plurality of seventh sipes 82, a plurality of eighth sipes 84, and a plurality of ninth sipes 86. The sipes 70, 72, 74, 76, 78, 80, 82, 84, 86 extend in the tire width direction in the land portion regions.

In the present embodiment, in the shoulder land portion region 42, the first lug grooves 52 extend from the outer side in the tire width direction toward the first shoulder side main groove 32, are connected with the first shoulder side main groove 32, and are disposed at intervals in the tire circumferential direction. The first lug grooves 52 are inclined, at a connection position with the first shoulder side main groove 32, toward one side in the tire circumferential direction with respect to the tire width direction. In the example illustrated in FIG. 3, the first lug groove 52 is bent halfway along the extension direction, and includes an outer portion 52a that extends in a direction parallel with the tire width direction, and an inner portion 52b that extends at an incline with respect to the tire width direction. In the example illustrated in FIG. 3, the bent position of the first lug groove 52 is a position in the tire width direction through which the narrow groove 31 extends.

On the other hand, in the first middle land portion region 44, the second lug groove 54 extends from a portion of the shoulder side main groove 32, the portion between connection positions of the first lug grooves 52 adjacent in the tire circumferential direction with the shoulder side main groove 32, toward the first center side main groove 34, and is closed within the first middle land portion region 44, and the second lug grooves 54 are disposed at intervals in the tire circumferential direction. The extension direction of the second lug grooves 54 is inclined with respect to the tire width direction to be parallel with the inclination direction of the first lug grooves 52.

As described above, in the present embodiment, the lug grooves 52, 54 are respectively disposed on both sides of the first shoulder side main groove 32, snow column shear force can be ensured that is required to kick off a snow-covered road surface, and steering stability performance on snow-covered road surfaces (hereinafter, also referred to as "on-snow performance") is improved. On the other hand, the tire circumferential positions of the lug grooves 52, 54 are offset from each other, and thus compared to a configuration in which, instead of being offset from each other, the lug grooves communicate linearly with each other at the connection positions with the first shoulder side main grooves 32, the present embodiment can reduce a difference in rigidity in the tire circumferential direction between the portion of the first shoulder land portion region 42 and the portion of the first middle land portion region 44 respectively located on both sides of the shoulder side main groove 32, reducing the distribution of rigidity in the tire circumferential direction. Thus, uneven wear such as heal and toe wear is unlikely to occur, leading to improved uneven wear resistance performance. This effect is enhanced due to the first lug grooves 52 and the second lug grooves 54 being inclined toward the same side in the tire circumferential direction with respect to the tire width direction. Consequently, according to the present embodiment, both steering stability on snow-covered road surfaces (hereinafter, also referred to as on-snow performance) and uneven wear resistance performance can be provided in a highly compatible manner. In a case where the lug grooves on both sides of the first shoulder side main groove 32 communicate linearly with each other at the connection positions with the first shoulder side main groove 32 instead of being offset from each other, the difference in rigidity in the tire circumferential direction increases. This increases the distribution of rigidity in the tire circumferential direction, making tread rubber members of the first shoulder land portion region 42 and the first middle land portion region 44 likely to deform. Thus, this configuration is advantageous in terms of exertion of snow column shear force, but is likely to be subjected to uneven wear.

According to one embodiment, the inclination direction of the first lug groove 52 at the above-described connection position is preferably 5 to 45 degrees with respect to the tire width direction. Lying parallel with the inclination direction of the first lug grooves 52 means inclination with respect to the inclination direction of the first lug grooves 52 at an angle of 10 degrees or less.

According to one embodiment, assuming that P1 is the interval in the tire circumferential direction between the first lug grooves 52 adjacent in the tire circumferential direction, the second lug groove 54 located between two lines L1 obtained by extending the first lug grooves 52 along the inclination direction of the first lug grooves 52 and across the first shoulder side main groove 32 is preferably located a length of from 40 to 60% of the interval P1 away in the tire circumferential direction from one of the two lines L1 closest to the second lug groove 54. In the example illustrated in FIG. 3, the second lug groove 54 is located a length of 50% of the interval P1 away in the tire circumferential direction from the line L1 closest to the second lug groove 54. The line L1 is an imaginary straight line and extends from a center position of the groove width of the first lug groove 52. The line L1 is defined for each first lug groove 52. The second lug groove 54 is located the above-described range of length away from the line L1, thus enabling a reduction in the distribution of the rigidity of the first shoulder land portion region 42 and the first middle land portion region 44 in the tire circumferential direction.

According to one embodiment, the outer ends of the first lug grooves 52 in the tire width direction are closed within the first shoulder land portion region 42, and the tread pattern further includes the first sipes 70 in the first shoulder land portion region 42, each of the first sipes 70 extending, from the closed end of the first lug groove 52, further to the outer side in the tire width direction than a ground contact edge 10a in the tire width direction, the ground contact edge 10a located in the first shoulder land portion. Provision of the first sipes 70 as described above allows the tread rubber member of the first shoulder land portion region 42 to be easily deformed while suppressing a reduction in the rigidity of the first shoulder land portion region 42. Thus, even in a case where the lug grooves 52, 54 do not communicate linearly with each other at the connection positions with the first shoulder side main groove 32, a great snow column shear force can be exerted. Consequently, both on-snow performance and uneven wear resistance performance can be provided in a highly compatible manner. In the present embodiment, the closed end of the first lug groove 52 is located further on the inner side in the tire width direction than the ground contact edge 10a.

The ground contact edges 10a, 10b are both edges of the ground contact surface in the tire width direction in a case where the tire 10 is brought into contact with a horizontal plane after the tire is assembled on a regular rim, inflated to regular internal pressure, and loaded with 88% of a regular load. "Regular rim" refers to a "measurement rim" defined by the Japan Automobile Tyre Manufacturers Association Inc. (JATMA), a "Design Rim" defined by the Tire and Rim Association, Inc. (TRA), or a "Measuring Rim" defined by the European Tyre and Rim Technical Organisation (ETRTO). "Regular internal pressure" refers to "maximum air pressure" defined by JATMA, a maximum value in "TIRE LOAD LIMITS AT VARIOUS COLD INFLATION PRESSURES" defined by TRA, or "INFLATION PRESSURES" defined by ETRTO. "Regular load" refers to a "maximum load capacity" defined by JATMA, a maximum value in "TIRE LOAD LIMITS AT VARIOUS COLD INFLATION PRESSURES" defined by TRA, or "LOAD CAPACITY" defined by ETRTO.

According to one embodiment, the tread pattern preferably further includes the second sipes 72 in the first middle land portion region 44, each of the second sipes 72 extending from the closed end of the second lug groove 54 to the inner side in the tire width direction. Provision of the second sipes 72 as described above allows the tread rubber member of the first middle land portion region 44 to be easily deformed, while suppressing a reduction in the rigidity of the first middle land portion region 44, allowing a great snow column shear force to be exerted. Consequently, both on-snow performance and uneven wear resistance performance can be provided in a highly compatible manner.

According to one embodiment, the tread pattern preferably further includes the second shoulder side main groove 38 and the second center side main groove 36, a plurality of the third lug grooves 56, a plurality of the fourth lug grooves 58, a plurality of fifth lug grooves 60, and a plurality of the sixth lug grooves 62.

In the second shoulder land portion region 50, the third lug grooves 56 each include a closed end, extend from the closed end toward the second shoulder side main groove 38, are connected with the second shoulder side main groove 38, and are disposed at intervals in the tire circumferential direction. Note that in the example illustrated in FIG. 3, the third lug groove 56 is bent halfway along the extension direction, and includes an outer portion 56a that extends in a direction parallel with the tire width direction, and an inner portion 56b that extends at an incline with respect to the tire width direction. In the example illustrated in FIG. 3, the bent position of the third lug groove 56 is a position in the tire width direction through which the narrow groove 39 extends.

In the second middle land portion region 48, the fourth lug grooves 58 each extend from the second shoulder side main groove 38 toward the second center side main groove 36 along extension lines L2 obtained by extending the third lug grooves 56 in both the extension direction of the third lug grooves 56 and a direction opposite the extension direction. The fourth lug grooves 58 are closed within the second middle land portion region 48 and disposed at intervals in the tire circumferential direction. The extension line L2 is an imaginary line, and in the example illustrated in FIG. 3, includes two straight lines differing in inclination angle with respect to the tire width direction and connected together. The extension line L2 is defined for each of the third lug grooves 56. Extending along the extension line L2 means extending in a direction that is inclined at an angle of 10 degrees or less to the inclination direction of the extension line L2 with respect to the tire width direction, and adjoining the extension line L2 or located a length of twice the groove width of the third lug groove 56 or less away from the extension line L2 in the tire circumferential direction.

In the second middle land portion region 48, the fifth lug grooves 60 each extend between the extension lines L2 adjacent in the tire circumferential direction from the second shoulder side main groove 38 toward the second center side main groove 36, are connected with the second center side main groove 36, and are disposed at intervals in the tire circumferential direction. The fifth lug groove 60 extends, at a connection position with the second shoulder side main groove 38, in a direction parallel with a portion of the extension line L2 extending in the extension direction of the third lug groove 56. The direction parallel with the extension line L2 means a direction inclined at an angle of 10 degrees or less with respect to the inclination direction of the extension line L2. In the example illustrated in FIG. 3, the direction parallel with the extension line L2 is the same direction as the extension direction of the inner portion 56b of the third lug groove 56. The fifth lug groove 60 preferably extends in a direction parallel with the extension line L2 in 50% or more of the region of the fifth lug groove 60 in the extension direction. In the example illustrated in FIG. 3, the fifth lug groove 60 includes, halfway along the extension direction thereof, a portion extending in a direction different from the direction of portions on both sides, in the tire width direction, of the fifth lug groove 60, the portions on both sides extending in the direction parallel with the extension line L2, and the fifth lug groove 60 bends at two sections.

In the second shoulder land portion region 50, the sixth lug grooves 62 each extend between the extension lines L2 adjacent in the tire circumferential direction, from a position that is spaced apart from the second shoulder side main groove 38 toward the outer side in the tire width direction, and are disposed at intervals in the tire circumferential direction. The sixth lug groove 62 extends in a direction parallel with a portion of the extension line L2 extending in the direction opposite to the extension direction of the third lug groove 56. In the example illustrated in FIG. 3, the sixth lug groove 62 is connected to the narrow groove 39 and includes a connection position with the narrow groove 39 as the end in the extension direction.

In this embodiment, the third lug groove 56 and the fourth lug groove 58 respectively located on both sides of the second shoulder side main groove 38 are disposed along the extension line L2, and the third lug groove 56 and the fourth lug groove 58 communicate linearly with each other at the connection positions with the second shoulder side main groove 38. Accordingly, a great snow column shear force is exerted, improving on-snow performance. On the other hand, because the third lug groove 56 and the fourth lug groove 58 are closed within the second shoulder land portion region 50 and the second middle land portion region 48, a reduction in the rigidity of the land portion region 50, 48 is suppressed, contributing to improvement in uneven wear resistance performance. In this regard, the length of the fourth lug groove 58 in the extension direction is preferably less than 50% of the length of the second middle land portion region 48 in the tire width direction.

In the present embodiment, the fifth lug groove 60 and the sixth lug groove 62 are disposed between two adjacent extension lines L2 as described above. The fifth lug grooves 60 communicate with the second shoulder side main groove 38 and the second center side main groove 36 and penetrate the second middle land portion region 48, and thus a great snow column shear force is exerted, improving on-snow performance. Additionally, the fifth lug groove 60 and the sixth lug groove 62 are disposed between the extension lines L2, and the sixth lug groove 62 is not connected to the second shoulder side main groove 38, leading to a small difference in rigidity in the tire circumferential direction between the portions of the land portion regions 50, 48 respectively located on both sides in the tire width direction around a portion of the second shoulder land portion region 50 as the center, the portion between the second shoulder side main groove 38 and the closed end of the sixth lug groove 62. This reduces the distribution of rigidity in the tire circumferential direction, contributing to improved uneven wear resistance performance. In this regard, the outer end of the sixth lug groove 62 in the tire width direction is preferably located further on the outer side in the tire width direction than the outer end of the third lug groove 56, and more preferably located further on the outer side in the tire width direction than the ground contact edge. Note that in the example illustrated in FIG. 3, the sixth lug groove 62 intersects with an imaginary line (not illustrated) obtained by extending the fifth lug groove 60 across the second shoulder side main groove 38. The intersection position is preferably a position in the tire width direction where the narrow groove 39 is located.

According to one embodiment, from the perspective of reducing the distribution of the rigidity in the tire circumferential direction, the third lug groove 56, the fourth lug groove 58, and the fifth lug groove 60 are preferably inclined in the tire width direction at the connection positions with the second shoulder side main groove 38, and are preferably at an angle of from 5 to 45 degrees with respect to the tire width direction. In addition, according to one embodiment, the inclination direction of the third lug groove 56, the inclination direction of the fourth lug groove 58, and the inclination direction of the fifth lug groove 60 at the connection positions with the second shoulder side main groove 38 are preferably parallel with one another. Being parallel with one another means that the angle difference between the groove having the smallest inclination angle and the groove having the largest inclination angle, with respect to the tire width direction, is 10 degrees or less. Additionally, the inclination directions are preferably equal to the inclination direction of the first lug groove 52 and the inclination direction of the second lug groove 54 at the connection positions with the first shoulder side main groove 32.

According to one embodiment, the sixth lug groove 62 is preferably located a length of from 40 to 60% of an interval P3 in the tire circumferential direction between the third lug grooves 56 adjacent in the tire circumferential direction, away from the third lug groove 56 (in the example illustrated in FIG. 3, the third lug groove 56 that is lower) that is disposed closest to the sixth lug groove 62 among the third lug grooves 56 adjacent in the tire circumferential direction across the sixth lug groove 62. In the example illustrated in FIG. 3, the sixth lug groove 62 is located a length of 50% of the interval P3 away from the third lug groove 56 closest to the sixth lug groove 62 in the tire circumferential direction. The sixth lug groove 62 is located the above-described range of length away from the third lug groove 56, thus enabling a reduction in the distribution of the rigidity of the second shoulder land portion region 50 in the tire circumferential direction.

According to one embodiment, the fifth lug groove 60 is preferably located a length of from 40 to 60% of an interval P4 in the tire circumferential direction between the fourth lug grooves 58 adjacent in the tire circumferential direction, away from the fourth lug groove 58 that is disposed closest to the fifth lug groove 60 among the fourth lug grooves 58 adjacent in the tire circumferential direction across the fifth lug groove 60. In the example illustrated in FIG. 3, the fifth lug groove 60 is located a length of 50% of the interval P4 away from the fourth lug groove 58 closest to the fifth lug groove 60 in the tire circumferential direction. The fifth lug groove 60 is located the above-described range of length away from the fourth lug groove 58, thus enabling a reduction in the distribution of the rigidity of the second middle land portion region 48 in the tire circumferential direction.

Note that the interval P3 and the interval P4 are equal.

According to one embodiment, the tread pattern preferably further includes the third sipes 74 in the second shoulder land portion region 50, each of the third sipes 74 extending to connect, with the closed end of the sixth lug groove 62, a connection position of the fifth lug groove 60 with the second shoulder side main groove 38. Provision of the third sipe 74 allows the tread rubber member of the second shoulder land portion region 50 to be easily deformed while suppressing a reduction in the rigidity of the second shoulder land portion region 50. Thus, even in a case where the lug grooves 60, 62 do not communicate with each other linearly at the connection positions with the second shoulder side main groove 38, a great snow column shear force can be exerted.

Additionally, according to one embodiment, the tread pattern further preferably includes the fourth sipes 76 in the second middle land portion region 48, each of the fourth sipes 76 extending from the closed end of the fourth lug groove 58 in a direction parallel with the extension direction of the fifth lug groove 60 and connecting with the second center side main groove 36. Provision of the fourth sipes 76 allows the tread rubber member of the second middle land portion region 48 to be easily deformed, while suppressing a reduction in the rigidity of the second middle land portion region 48, allowing a great snow column shear force to be exerted.

According to these embodiments, on the second side, the third lug groove 56 and the fourth lug groove 58 communicate linearly with each other at the connection positions with the second shoulder side main groove 38, and at least one of the set of third sipes 74 and the set of fourth sipes 76 is provided, as descried above. This significantly improves on-snow performance, allowing both on-snow performance and uneven wear resistance performance to be provided in a highly compatible manner.

The tread pattern described above is suitable in a case where the vehicle mounting orientation is designated such that the first side faces the vehicle inner side (IN side). The IN side is subjected to low lateral acceleration and has low severity during traveling. Lower severity is more likely to cause uneven wear. According to the present embodiment, as described above, the distribution of the rigidity of the first shoulder land portion region 42 and the first middle land portion region 44 in the tire circumferential direction can be reduced, and thus the first side is disposed on the IN side, effectively suppressing the occurrence of uneven wear on the IN side, the IN side having low severity.

Furthermore, as in the above-described embodiment, in a case where the tire includes the second shoulder side main groove 38 and the second center side main groove 36, the plurality of third lug grooves 56, the plurality of fourth lug grooves 58, the plurality of fifth lug grooves 60, and the plurality of sixth lug grooves 62, the second side is disposed on the OUT side, thus allowing for increased snow column shear force and improved on-snow performance on the OUT side, the OUT side subjected to an increased load during turning.

According to one embodiment, preferably, groove area ratio ranges from 25 to 36%, main groove area ratio ranges from 15 to 22%, and snow traction index STI ranges from 115 to 150.

Groove area ratio means the ratio of the total of opening areas of the main grooves and the lug grooves, in the ground contact surface of the tread portion 10T, to the area of the ground contact surface. Groove area ratio preferably ranges from 27 to 33%.

Main groove area ratio means the ratio of the total of opening areas of the main grooves, in the ground contact surface of the tread pattern, to the area of the ground contact surface. Main groove area ratio preferably ranges from 17 to 20%.

STI means an index expressed by Formula (1) below.

$$STI=-6.8+2202*\rho_g+672*\rho_s+7.6*D_g \qquad (1)$$

In Formula (1), $\rho_g$ is a value obtained by dividing the total length (mm) of the lengths of all the lug grooves provided in the land portion region, the lengths being projected in the tire width direction, by the (ground contact width×circumferential length of the land portion region) (mm²), $\rho_s$ is a value obtained by dividing the total length (mm) of the lengths of all the sipes provided in the land portion region, the lengths being projected in the tire width direction, by the (ground contact width×circumferential length of the land portion region) (mm²), and $D_g$ is the average depth (mm) of the lug grooves provided in the land portion region. STI is a well-known index and is described in, for example, JP 2824675 B. STI preferably ranges from 125 to 140.

In the first middle land portion region 44, the seventh lug groove 64 extends from the first center side main groove 34 toward the first shoulder side main groove 32, and is closed within the first middle land portion region 44. The seventh lug grooves 64 are disposed at intervals in the tire circumferential direction. The seventh lug groove 64 is inclined with respect to the tire width direction to be parallel with the inclination direction of the first lug grooves 52.

In the center land portion region 46, the eighth lug groove 66 extends from the first center side main groove 34 toward the second center side main groove 36, and is closed within the center land portion region 46. The eighth lug grooves 66 are disposed at intervals in the tire circumferential direction. The eighth lug groove 66 is inclined with respect to the tire width direction to be parallel with the inclination direction of the first lug grooves 52. In the first shoulder land portion region 42, the ninth lug grooves 68 each extend from a position that is spaced apart from the first shoulder side main groove 32 toward the outer side in the tire width direction and are disposed at intervals in the tire circumferential direction. The ninth lug groove 68 is connected to the narrow groove 31 and has a connection position with the narrow groove 31 as the end in the extension direction.

In the first shoulder land portion region 42, the fifth sipes 78 each extend connecting the connection position of the second lug groove 54 with the first shoulder side main groove 32, with the closed end of the ninth lug groove 68, and the fifth sipes 78 are disposed at intervals in the tire circumferential direction. The fifth sipe 78 is inclined with respect to the tire width direction to be parallel with the inclination direction of the first lug grooves 52.

In the first middle land portion region 44, the sixth sipes 80 each extend from the closed end of the seventh lug groove 64 toward the first shoulder side main groove 32, are connected with the first shoulder side main groove 32, and are disposed at intervals in the tire circumferential direction. The sixth sipe 80 is inclined with respect to the tire width direction to be parallel with the inclination direction of the first lug grooves 52.

In the center land portion region 46, the seventh sipes 82 and the eighth sipes 84 each extend from the first center side main groove 34 toward the second center side main groove 36, are connected with the second center side main groove 36, and are disposed at intervals in the tire circumferential direction. The seventh sipe 82 and the eighth sipe 84 are inclined with respect to the tire width direction to be parallel with the inclination direction of the first lug grooves 52.

In the second shoulder land portion region 50, each of the ninth sipes 86 extends from the closed end of the third lug groove 56 further to the outer side in the tire width direction than the ground contact edge 10b.

According to one embodiment, all of the lug grooves and the sipes disposed in the region between the narrow grooves 31 and 39 are preferably inclined to the same side in the tire circumferential direction with respect to the tire width direction. In this case, the inclination angles of the lug grooves and the sipes with respect to the tire width direction are preferably equal to one another. The equal inclination angles refer to the angle difference between the greatest inclination angle and the smallest inclination angle of the lug grooves and the sipes being 10 degrees or less.

According to one embodiment, the length in the extension direction of the second lug groove 54 is preferably 50% or more of the length in the tire width direction of the first middle land portion region 44. Accordingly, snow column shear force can be ensured even in a case where the connection position of the second lug groove 54 with the first shoulder side main groove 32 is offset from the first lug groove 52 in the tire circumferential direction.

According to one embodiment, the length of the seventh lug groove 64 in the extension direction is preferably 50% or more of the length in the tire width direction of the first middle land portion region 44.

According to one embodiment, the region in the tire width direction in which the second lug groove 54 extends preferably overlaps the region in the tire width direction in which the seventh lug groove 64 extends.

In the present embodiment, the tread pattern of the tire 10 is not limited to the tread pattern illustrated in FIG. 3. The configuration of the second side may differ from the configuration including the second shoulder side main groove 38 and the second center side main groove 36, the plurality of third lug grooves 56, the plurality of fourth lug grooves 58, the plurality of fifth lug grooves 60, and the plurality of sixth lug grooves 62 as in the above-described embodiment.

COMPARATIVE EXAMPLES AND EXAMPLES

To examine the effects of the pneumatic tire of the present embodiment, the tread pattern of the tire was varied, and on-snow performance and uneven wear resistance performance were examined. The prototype tires each had a tire size of 235/60R18 and a cross-sectional shape illustrated in FIG. 2, and were based on the tread pattern illustrated in FIG. 3, except for configurations indicated in Table 1 and configurations described below.

Table 1 indicates a configuration related to the tread pattern of each of the tires and evaluation results for the tread pattern.

In Table 1, "the amount of misalignment between the first lug groove and the second lug groove" means the ratio (%), to the interval (pitch length of the first shoulder land portion region) P1 between the two adjacent first lug grooves, of the interval between the second lug groove and one of the lines L1 respectively located on both sides of the second lug groove in the tire circumferential direction, the line L1 being located below the second lug groove in FIG. 3. Note that the "amount of misalignment" indicated in Table 1 means the average value of the amount of misalignment of the entire circumference in the tire circumferential direction.

The amount of misalignment of the first lug groove and the second lug groove was adjusted by shifting the first shoulder land portion region in the tire circumferential direction with respect to the first middle land portion region.

In Table 1, "the amount of misalignment between the third lug groove and the fourth lug groove" and "the amount of misalignment between the fifth lug groove and the sixth lug groove" indicates, with a case of the fourth lug groove located on the extension line L2 of the third lug groove being defined as 0%, by what percentage of the interval between adjacent third lug grooves (pitch length of the second shoulder land portion region) P3 each of the fourth lug groove and the fifth lug groove is misaligned in the tire circumferential direction.

The "amount of misalignment of the third lug groove and the fourth lug groove" and the "amount of misalignment of the fifth lug groove and the sixth lug groove" were adjusted by shifting the second shoulder land portion region in the tire circumferential direction with respect to the second middle land portion region.

"No" in connection with the "presence of the sixth lug groove connecting with the second shoulder side main groove" means that the sixth lug groove is closed within the second shoulder land portion region instead of connecting with the second shoulder side main groove.

"No" in connection with the "presence of the fifth lug groove connecting with the second center side main groove" means that the fifth lug groove is closed within the second middle land portion region instead of connecting with the second center side main groove. Note that in both cases of "Yes" and "No", the fifth lug groove was connected with the second shoulder side main groove.

In Table 1, "Out" means the vehicle outer side, and "In" means the vehicle inner side.

In all of Comparative Example and Examples 1 to 6, groove area ratio was set to 30%, main groove area ratio was set to 19%, and STI was set to 133.

On-snow performance and uneven wear resistance performance for these test tires were evaluated according to the following methods and the results were recorded in Table 1. For the evaluations, the test tires were assembled on wheels having a rim size of 18×7.5 J, mounted on a front wheel drive vehicle of 2400 cc engine displacement, and the air pressure after warm-up was set to 230 kPa.

On-Snow Performance

Sensory evaluation was performed for steering characteristics, straightness, and the like when a test driver traveled in the range of 0 to 80 km/hour on a test course of a snow-covered road surface. The results are expressed as index values with Comparative Example being assigned the value of 100. Larger index values mean excellent on-snow performance.

Uneven Wear Resistance Performance

Each of the test tires was mounted on the test vehicle, and the test vehicle traveled for 10000 km with a difference in the amount (step amount) of heal and toe wear measured for every 1000 km traveling. The reciprocal of the maximum value of the step amount was used, and Comparative Example was assigned the value of 100. Larger index values mean superior uneven wear resistance performance.

Additionally, when the index of on-snow performance was 100 or more, the index of uneven wear resistance performance was 102 or more, and the total of the index of on-snow performance and the index of uneven wear resistance performance was 202 or more, the on-snow performance and uneven wear resistance performance were determined to be provided in a highly compatible manner.

TABLE 1

| | Comparative Example | Example 1 | Example 2 |
|---|---|---|---|
| Amount of misalignment between first lug groove and second lug groove (%) | 0 | 20 | 50 |
| Amount of misalignment between third lug groove and fourth lug groove (%) | 0 | 0 | 0 |
| Amount of misalignment between fifth lug groove and sixth lug groove (%) | 0 | 0 | 0 |
| Presence of fifth lug groove connected with second center side main groove | Yes | Yes | Yes |
| Presence of sixth lug groove connected with second shoulder side main groove | No | No | No |
| Side faced by first side | Out | Out | Out |
| On-snow performance | 100 | 100 | 100 |
| Uneven wear resistance performance | 100 | 102 | 103 |

| | Example 3 | Example 4 | Example 5 | Example 6 |
|---|---|---|---|---|
| Amount of misalignment between first lug groove and second lug groove (%) | 50 | 50 | 50 | 50 |
| Amount of misalignment between third lug groove and fourth lug groove (%) | 20 | 0 | 0 | 0 |
| Amount of misalignment between fifth lug groove and sixth lug groove (%) | 20 | 0 | 0 | 0 |
| Presence of fifth lug groove connected with second center side main groove | Yes | Yes | Yes | No |
| Presence of sixth lug groove connected with second shoulder side main groove | No | No | Yes | No |
| Side faced by first side | Out | In | In | In |
| On-snow performance | 100 | 103 | 105 | 102 |
| Uneven wear resistance performance | 106 | 106 | 104 | 105 |

A comparison of Examples 1 to 6 with Comparative Example indicates that both on-snow performance and uneven wear performance can be provided in a highly compatible manner in a case where the amount of misalignment between the first lug groove and the second lug groove is greater than 0%, that is, the first lug groove and the second lug groove are offset from each other in the tire circumferential direction at the connection positions with the first shoulder side main groove.

A comparison between Example 1 and Example 2 indicates that both on-snow performance and uneven wear resistance performance can be provided in a highly compatible manner in a case where the amount of misalignment between the first lug groove and the second lug groove is 40 to 60%.

A comparison between Example 2 and Example 3 indicates that an unexpected effect of improving uneven wear resistance is produced in a case where "the amount of misalignment between the third lug groove and the fourth lug groove" and "the amount of misalignment between the fifth lug groove and the sixth lug groove" are 15 to 25%.

A comparison between Example 2 and Example 4 indicates that the effect of providing both on-snow performance and uneven wear resistance performance in a highly compatible manner is enhanced in a case where the first side of the tread pattern is disposed facing the vehicle inner side.

The pneumatic tire according to an embodiment of the present technology is described above in detail. However, the pneumatic tire according to an embodiment of the present technology is not limited to the above-described embodiments or examples and may of course be enhanced or modified in various ways without departing from the scope of the present technology.

The invention claimed is:

1. A pneumatic tire, comprising a tread pattern in a tread portion,
the tread pattern comprising:
a shoulder side main groove and a center side main groove disposed at an interval on a first side in a tire width direction with respect to a tire centerline and extending in a tire circumferential direction;
a plurality of first lug grooves in a region of a shoulder land portion located on an outer side of the shoulder side main groove in the tire width direction, the first lug grooves extending from an outer side in the tire width direction toward the shoulder side main groove and connecting with the shoulder side main groove, the first lug grooves being disposed at intervals in the tire circumferential direction;

a plurality of second lug grooves in a region of a middle land portion interposed between the shoulder side main groove and the center side main groove, the second lug grooves extending from a portion of the shoulder side main groove between connection positions of the first lug grooves adjacent in the tire circumferential direction with the shoulder side main groove, toward the center side main groove, the second lug grooves being closed within the region of the middle land portion, the second lug grooves being disposed at intervals in the tire circumferential direction; and a plurality of seventh lug grooves in the region of the middle land portion, the seventh lug grooves extending from the center side main groove towards the shoulder side main groove, the seventh lug grooves being closed within the region of the middle land portion, the seventh lug grooves being disposed at intervals in the tire circumferential direction, the first lug grooves being inclined, at the connection position, to one side in the tire circumferential direction with respect to the tire width direction, the second lug grooves being inclined with respect to the tire width direction to be parallel with an inclination direction of the first lug groove, and the seventh lug grooves being inclined with respect to the tire width direction to be parallel with the inclination direction of the first lug grooves.

2. The pneumatic tire according to claim 1, wherein assuming that P1 is the interval in the tire circumferential direction between the first lug grooves adjacent in the tire circumferential direction, the second lug grooves located between two lines obtained by extending the first lug grooves along the inclination direction of the first lug grooves and across the shoulder side main groove is located a length of from 40 to 60% of the interval P1 away in the tire circumferential direction from one of the lines that is closest to the second lug grooves.

3. The pneumatic tire according to claim 2, wherein an outer end of the first lug groove in the tire width direction is closed within the region of the shoulder land portion, and the tread pattern further comprises a first sipe in the region of the shoulder land portion, the first sipe extending, from a closed end of the first lug grooves, further to the outer side in the tire width direction than a ground contact edge in the tire width direction, the ground contact edge located in the shoulder land portion.

4. The pneumatic tire according to claim 3, wherein the tread pattern further comprises, in the region of the middle land portion, a second sipe extending from a closed end of the second lug grooves to an inner side in the tire width direction.

5. The pneumatic tire according to claim 1, wherein an outer end of the first lug grooves in the tire width direction is closed within the region of the shoulder land portion, and the tread pattern further comprises a first sipe in the region of the shoulder land portion, the first sipe extending, from a closed end of the first lug grooves, further to the outer side in the tire width direction than a ground contact edge in the tire width direction, the ground contact edge located in the shoulder land portion.

6. The pneumatic tire according to claim 1, wherein the tread pattern further comprises, in the region of the middle land portion, a second sipe extending from a closed end of the second lug grooves to an inner side in the tire width direction.

7. The pneumatic tire according to claim 1, wherein the tread pattern has a vehicle mounting orientation designated such that the first side faces a vehicle inner side.

8. The pneumatic tire according to claim 1, wherein a ratio of a total of opening areas of main grooves, including at least the shoulder side main groove and the center side main groove, and lug grooves, including at least the first lug grooves, the second lug grooves and the seventh lug grooves, in a ground contact surface of the tread portion to an area of the ground contact surface of the tread portion ranges from 25 to 36%, a ratio of a total of opening areas of the main grooves in the ground contact surface of the tread portion to the area of the ground contact surface of the tread pattern ranges from 15 to 22%, and a snow traction index expressed by Formula (1) below ranges from 115 to 150:

$$STI = -6.8 + 2202*\rho_g + 672*\rho_s + 7.6*D_g \qquad (1);$$

in Formula (1), $\rho_g$ is a value obtained by dividing a total length (mm) of lengths of all the lug grooves provided in the region of the land portion, the lengths being projected in the tire width direction, by a ground contact width multiplied by a circumferential length of the region of the land portion (mm²), $\rho_s$ is a value obtained by dividing a total length (mm) of lengths of all sipes provided in the region of the land portion, the lengths being projected in the tire width direction, by the ground contact width multiplied by the circumferential length of the region of the land portion (mm²), and $D_g$ is an average depth (mm) of the lug grooves provided in the region of the land portion.

9. A pneumatic tire, comprising a tread pattern in a tread portion, the tread pattern comprising:

a shoulder side main groove and a center side main groove disposed at an interval on a first side in a tire width direction with respect to a tire centerline and extending in a tire circumferential direction;

a plurality of first lug grooves in a region of a shoulder land portion located on an outer side of the shoulder side main groove in the tire width direction, the first lug grooves extending from an outer side in the tire width direction toward the shoulder side main groove and connecting with the shoulder side main groove, the first lug grooves being disposed at intervals in the tire circumferential direction; and a plurality of second lug grooves in a region of a middle land portion interposed between the shoulder side main groove and the center side main groove, the second lug grooves extending from a portion of the shoulder side main groove between connection positions of the first lug grooves adjacent in the tire circumferential direction with the shoulder side main groove, toward the center side main groove, the second lug grooves being closed within the region of the middle land portion, the second lug grooves being disposed at intervals in the tire circumferential direction, the first lug grooves being inclined, at the connection position, to one side in the tire circumferential direction with respect to the tire width direction, and the second lug grooves being inclined with respect to the tire width direction to be parallel with an inclination direction of the first lug groove, wherein in a case where the shoulder side main groove and the center side main groove are designated as a first shoulder side main groove and a first center side main groove and where the shoulder land portion and the middle land portion are designated as a first shoulder land portion and a first middle land portion, the tread pattern further comprises:

a second shoulder side main groove and a second center side main groove disposed at an interval on a second side in the tire width direction with respect to the tire centerline, the second side differing from the first side, the second shoulder side main groove and the second center side main groove extending in the tire circumferential direction;

a plurality of third lug grooves in a region of a second shoulder land portion located on an outer side of the second shoulder side main groove in the tire width direction, the third lug grooves comprising a closed end and extending from the closed end toward the second shoulder side main groove and connecting with the second shoulder side main groove, the third lug grooves being disposed at intervals in the tire circumferential direction;

a plurality of fourth lug grooves in a region of a second middle land portion interposed between the second shoulder side main groove and the second center side main groove, the fourth lug grooves extending from the second shoulder side main groove toward the second center side main groove along extension lines obtained by extending the third lug grooves in both an extension direction of the third lug grooves and a direction opposite to the extension direction, the fourth lug grooves each being closed within the second middle land portion and being disposed at intervals in the tire circumferential direction;

a plurality of fifth lug grooves in the region of the second middle land portion, the fifth lug grooves extending between the extension lines adjacent in the tire circumferential direction, from the second shoulder side main groove toward the second center side main groove and connecting with the second center side main groove, the fifth lug grooves being disposed at intervals in the tire circumferential direction; and a plurality of sixth lug grooves in the region of the second shoulder land portion, the sixth lug grooves extending between the extension lines adjacent in the tire circumferential direction, from a position spaced apart from the second shoulder side main groove toward an outer side in the tire width direction, the sixth lug grooves being disposed at intervals in the tire circumferential direction, the fifth lug grooves extending, at a connection position with the second shoulder side main groove, in a direction parallel with portions of the extension lines extending in the extension direction, and the sixth lug grooves extending in a direction parallel with portions of the extension lines extending in the direction opposite to the extension direction.

10. The pneumatic tire according to claim 9, wherein the sixth lug grooves are located a length of from 40 to 60% of an interval P3 in the tire circumferential direction between the third lug grooves adjacent in the tire circumferential direction, away from the third lug grooves disposed closest to the sixth lug grooves among the third lug grooves adjacent across the sixth lug grooves in the tire circumferential direction.

11. The pneumatic tire according to claim 9, wherein the fifth lug grooves are located a length of from 40 to 60% of an interval P4 in the tire circumferential direction between the fourth lug grooves adjacent in the tire circumferential direction, away from the fourth lug grooves disposed closest to the fifth lug grooves among the fourth lug grooves adjacent across the fifth lug grooves in the tire circumferential direction.

12. The pneumatic tire according to claim 9, wherein the tread pattern further comprises a third sipe in the region of the second shoulder land portion, the third sipe extending and connecting, with a closed end of the sixth lug grooves, a connection position of the fifth lug grooves with the second shoulder side main groove.

13. The pneumatic tire according to claim 9, wherein the tread pattern further comprises a fourth sipe in the region of the second middle land portion, the fourth sipe extending from a closed end of the fourth lug grooves in a direction parallel with the extension direction of the fifth lug grooves and connecting with the second center side main groove.

14. A pneumatic tire, comprising a tread pattern in a tread portion, the tread pattern comprising:

a shoulder side main groove and a center side main groove disposed at an interval on a first side in a tire width direction with respect to a tire centerline and extending in a tire circumferential direction;

a plurality of first lug grooves in a region of a shoulder land portion located on an outer side of the shoulder side main groove in the tire width direction, the first lug grooves extending from an outer side in the tire width direction toward the shoulder side main groove and connecting with the shoulder side main groove, the first lug grooves being disposed at intervals in the tire circumferential direction; and a plurality of second lug grooves in a region of a middle land portion interposed between the shoulder side main groove and the center side main groove, the second lug grooves extending from a portion of the shoulder side main groove between connection positions of the first lug grooves adjacent in the tire circumferential direction with the shoulder side main groove, toward the center side main groove, the second lug grooves being closed within the region of the middle land portion, the second lug grooves being disposed at intervals in the tire circumferential direction, the first lug grooves being inclined, at the connection position, to one side in the tire circumferential direction with respect to the tire width direction, and the second lug grooves being inclined with respect to the tire width direction to be parallel with an inclination direction of the first lug groove, wherein assuming that P1 is the interval in the tire circumferential direction between the first lug grooves adjacent in the tire circumferential direction, the second lug grooves located between two lines obtained by extending the first lug grooves along the inclination direction of the first lug grooves and across the shoulder side main groove is located a length of from 40 to 60% of the interval P1 away in the tire circumferential direction from one of the lines that is closest to the second lug grooves, an outer end of the first lug grooves in the tire width direction is closed within the region of the shoulder land portion, the tread pattern further comprises a first sipe in the region of the shoulder land portion, the first sipe extending, from a closed end of the first lug grooves, further to the outer side in the tire width direction than a ground contact edge in the tire width direction, the ground contact edge located in the shoulder land portion, the tread pattern further comprises, in the region of the middle land portion, a second sipe extending from a closed end of the second lug grooves to an inner side in the tire width direction, and in a case where the shoulder side main groove and the center side main groove are designated as a first shoulder side main groove and a first center side main groove and where the shoulder land portion and the middle land portion are designated as a first shoulder land portion and a first middle land portion, the tread pattern further comprises:

a second shoulder side main groove and a second center side main groove disposed at an interval on a second side in the tire width direction with respect to the tire centerline, the second side differing from the first side, the second shoulder side main groove and the second center side main groove extending in the tire circumferential direction;

a plurality of third lug grooves in a region of a second shoulder land portion located on an outer side of the second shoulder side main groove in the tire width direction, the third lug grooves comprising a closed end and extending from the closed end toward the second shoulder side main groove and connecting with the second shoulder side main groove, the third lug grooves being disposed at intervals in the tire circumferential direction;

a plurality of fourth lug grooves in a region of a second middle land portion interposed between the second shoulder side main groove and the second center side main groove, the fourth lug grooves extending from the second shoulder side main groove toward the second center side main groove along extension lines obtained by extending the third lug grooves in both an extension direction of the third lug grooves and a direction opposite to the extension direction, the fourth lug grooves each being closed within the second middle land portion and being disposed at intervals in the tire circumferential direction;

a plurality of fifth lug grooves in the region of the second middle land portion, the fifth lug grooves extending between the extension lines adjacent in the tire circumferential direction, from the second shoulder side main groove toward the second center side main groove and connecting with the second center side main groove, the fifth lug grooves being disposed at intervals in the tire circumferential direction; and a plurality of sixth lug grooves in the region of the second shoulder land portion, the sixth lug grooves extending between the extension lines adjacent in the tire circumferential direction, from a position spaced apart from the second shoulder side main groove toward an outer side in the tire width direction, the sixth lug grooves being disposed at intervals in the tire circumferential direction, the fifth lug grooves extending, at a connection position with the second shoulder side main groove, in a direction parallel with portions of the extension lines extending in the extension direction, and the sixth lug grooves extending in a direction parallel with portions of the extension lines extending in the direction opposite to the extension direction.

15. The pneumatic tire according to claim 14, wherein the sixth lug grooves are located a length of from 40 to 60% of an interval P3 in the tire circumferential direction between the third lug grooves adjacent in the tire circumferential direction, away from the third lug grooves disposed closest to the sixth lug grooves among the third lug grooves adjacent across the sixth lug groove in the tire circumferential direction.

16. The pneumatic tire according to claim 15, wherein the fifth lug grooves are located a length of from 40 to 60% of an interval P4 in the tire circumferential direction between the fourth lug grooves adjacent in the tire circumferential direction, away from the fourth lug grooves disposed closest to the fifth lug grooves among the fourth lug grooves adjacent across the fifth lug grooves in the tire circumferential direction.

17. The pneumatic tire according to claim 16, wherein the tread pattern further comprises a third sipe in the region of the second shoulder land portion, the third sipe extending and connecting, with a closed end of the sixth lug grooves, a connection position of the fifth lug grooves with the second shoulder side main groove.

18. The pneumatic tire according to claim 17, wherein the tread pattern further comprises a fourth sipe in the region of the second middle land portion, the fourth sipe extending from a closed end of the fourth lug grooves in a direction parallel with the extension direction of the fifth lug grooves and connecting with the second center side main groove.

19. The pneumatic tire according to claim 18, wherein the tread pattern has a vehicle mounting orientation designated such that the first side faces a vehicle inner side.

* * * * *